United States Patent
Jung et al.

(10) Patent No.: US 9,213,435 B2
(45) Date of Patent: Dec. 15, 2015

(54) METHOD AND SYSTEM FOR SELECTING ITEMS USING TOUCHSCREEN

(71) Applicant: Hyundai Motor Company, Seoul (KR)

(72) Inventors: Woochul Jung, Seoul (KR); Young Woo Choi, Incheon (KR)

(73) Assignee: Hyundai Motor Company, Seoul (KR)

( * ) Notice: Subject to any disclaimer, the term of this patent is extended or adjusted under 35 U.S.C. 154(b) by 143 days.

(21) Appl. No.: 14/088,822

(22) Filed: Nov. 25, 2013

(65) Prior Publication Data

US 2014/0292725 A1    Oct. 2, 2014

(30) Foreign Application Priority Data

Mar. 27, 2013 (KR) .......................... 10-2013-0033010

(51) Int. Cl.
| | |
|---|---|
| G06F 3/048 | (2013.01) |
| G06F 3/0484 | (2013.01) |
| G06F 3/041 | (2006.01) |
| G06F 3/0481 | (2013.01) |

(52) U.S. Cl.
CPC ............. *G06F 3/0416* (2013.01); *G06F 3/0418* (2013.01); *G06F 3/04817* (2013.01); *G06F 3/04842* (2013.01); *G06F 3/0481* (2013.01)

(58) Field of Classification Search
CPC . G06F 3/0481; G06F 3/04817; G06F 3/0482; G06F 3/0488; G06F 3/04883; G06F 3/0486; G06F 3/048; G06F 3/0412; G06F 3/041; G06F 3/03545; G06F 3/03546; G06F 3/03547; G06F 3/0416; G06F 3/0418; G06F 3/04842

USPC .......................................................... 345/178
See application file for complete search history.

(56) References Cited

U.S. PATENT DOCUMENTS

| | | | | |
|---|---|---|---|---|
| 5,315,313 | A * | 5/1994 | Shinagawa ..................... | 345/159 |
| 5,757,358 | A * | 5/1998 | Osga ............................. | 715/862 |
| 6,040,824 | A * | 3/2000 | Maekawa et al. ............ | 345/173 |
| 6,883,145 | B2 * | 4/2005 | Jaeger .......................... | 715/767 |
| 7,844,914 | B2 * | 11/2010 | Andre et al. .................. | 715/773 |
| 8,675,014 | B1 * | 3/2014 | Milne et al. .................. | 345/629 |
| 2004/0095395 | A1 * | 5/2004 | Kurtenbach .................. | 345/810 |
| 2007/0094620 | A1 * | 4/2007 | Park ..................... | G06F 3/0481 715/862 |
| 2010/0044120 | A1 | 2/2010 | Richter | |

FOREIGN PATENT DOCUMENTS

| | | |
|---|---|---|
| JP | 2007-109200 A | 4/2007 |
| JP | 2009301302 A | 12/2009 |

(Continued)

*Primary Examiner* — Julie Anne Watko
(74) *Attorney, Agent, or Firm* — Mintz Levin Cohn Ferris Glovsky and Popeo, P.C.; Peter F. Corless

(57) ABSTRACT

A method for selecting items using a touchscreen includes displaying a plurality of items as icons on the touchscreen, receiving a touch signal including information on a touch point on the touchscreen, and determining one or more selected items from among the plurality of items upon reception of the touch signal. A system for selecting items includes a touchscreen including a display unit for displaying a plurality of items as icons and an input unit displayed on the display unit and displaying coordinate data corresponding to a touch applied to the display unit, a storage unit storing content, and a controller for controlling the display unit of the touchscreen and the storage unit on the basis of a touch signal received through the input unit of the touchscreen.

13 Claims, 14 Drawing Sheets

(56) References Cited

FOREIGN PATENT DOCUMENTS

| | | | |
|---|---|---|---|
| JP | 2012-133528 A | 7/2012 | |
| KR | 10-2002-0082510 A | 10/2002 | |
| KR | 1020020082510 A | * 10/2002 | |
| KR | 10-2004-0108208 | 12/2004 | |
| KR | 10-0672605 B1 | * 1/2007 | |

* cited by examiner

FIG. 14

| | ITEM 1 | ITEM 2 | ITEM 3 | ITEM 4 | ITEM 5 | ITEM 6 | ITEM 7 | ITEM 8 | ITEM N |
|---|---|---|---|---|---|---|---|---|---|
| | Bright | Exciting | Powerful | Lonely | Dreamy | Active | Calm | Magnificent | Noisy |
| | 0 | 0 | 0.4 | 0 | 0 | 0.4 | 0 | 0 | 0.2 |

| | ITEM 1 | ITEM 2 | ITEM 3 | ITEM 4 | ITEM 5 | ITEM 6 | ITEM 7 | ITEM 8 | ITEM N |
|---|---|---|---|---|---|---|---|---|---|
| Beautiful Moon.MP3 | 0.004255 | 0 | 0.042704 | 0.059783 | 0.03546 | 0.005576 | 0 | 0.05068 | 0.003216 |
| Hey billy.MP3 | 0.002837 | 0.071813 | 0.035587 | 0.51631 | 0.046098 | 0.009293 | 0 | 0.055623 | 0.303261 |
| Kingstar.MP3 | 0.001418 | 0.44883 | 0.046263 | 0.046196 | 0.031914 | 0.005576 | 0 | 0.065513 | 0.035326 |
| Rebirth.MP3 | 0.015603 | 0.64632 | 0.064057 | 0.046196 | 0.024822 | 0.018588 | 0.009756 | 0.111248 | 0.027174 |
| Talk.MP3 | 0 | 0.077199 | 0.032028 | 0.065218 | 0.039006 | 0.009293 | 0.004879 | 0.061804 | 0.059783 |
| ... | | | | | | | | | |

⇒ SEARCH

METHOD AND SYSTEM FOR SELECTING ITEMS USING TOUCHSCREEN

CROSS-REFERENCE TO RELATED APPLICATION

This application claims priority under 35 U.S.C. §119(a) to and the benefit of Korean Patent Application No. 10-2013-0033010 filed in the Korean Intellectual Property Office on Mar. 27, 2013, the entire contents of which are incorporated herein by reference.

BACKGROUND (a) Field of the Invention

The present invention relates to a method and system for selecting items using a touchscreen. More specifically, the present invention relates to a method and system for selecting items displayed on a touchscreen using the touchscreen.

(b) Description of the Related Art

Digital terminals are commonly provided in various applications, including in vehicles. Digital terminals typically provide user interfaces including a button assigned to a direction key function or a keypad.

As a touchscreen has been widely used, user interfaces using a touch input are provided. A touchscreen is constructed in such a manner that, when a user touches a character displayed on a screen or a specific point of the screen without using a keyboard, the touched point is detected to recognize an item selected by the user and execute a command corresponding to the item using stored software.

Conventional touchscreens allow a user to select a single item by a single touch input, and thus the user needs to apply multiple touch inputs in order to select a plurality of items. Particularly, when a user touches a touchscreen multiple times while driving a car, such actions may impede safe driving. Accordingly, an effective interface provision method capable of selecting a plurality of items according to a touch input or a dragging operation is needed.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a method for selecting items displayed on a touchscreen by a touch input or a dragging operation.

An exemplary embodiment of the present invention provides a method for selecting items using a touchscreen, including: displaying a plurality of items as icons on the touchscreen; receiving a touch signal including information on a touch point on the touchscreen; and determining one or more selected items from among the plurality of items upon reception of the touch signal.

The plurality of icons may be represented in the form of a combination of at least one of: a circle, a polygon, text, and an image displayed on a predetermined region of the touchscreen.

The plurality of icons may be displayed in the same color or different colors.

When the plurality of items has correlation, icons respectively corresponding to items having highest correlation therebetween may be displayed closest to each other and icons respectively corresponding to items having lowest correlation therebetween may be displayed with a longest distance therebetween.

The determining of one or more selected items may include determining whether the touch point corresponds to one of the plurality of icons on the basis of the information on the touch point included in the received touch signal.

The icon corresponding to the touch point may be determined when the touch point corresponds to one of the plurality of icons and one or more icons disposed within a predetermined distance from the touch point may be determined when the touch point does not correspond to any of the plurality of icons.

An icon indicating an item having low correlation with an item corresponding to an icon closest to the touch point may be excluded from the determined icons, and the distance between the touch point and the icon may be normalized to a value in the range of 0 to 1 using a distance vector.

The determining of one or more selected items may include determining whether a dragging operation of moving the touch point is performed on the basis of the information on the touch point included in the received touch signal.

One or more items corresponding to the determined icons may be determined as selected items when the dragging operation of moving the touch point is not performed and one or more items corresponding to one or more icons disposed within the dragging range of the dragging operation may be determined as selected items when the dragging operation of moving the touch point is performed.

The method may further include displaying connections between the one or more icons indicating the determined selected items and the touch point.

Connections between the one or more icons corresponding to the determined selected items and the touch point may be sequentially displayed from the icon closest to the touch point.

The method may further include comprising executing content corresponding to the determined selected items.

The content may include information on a relative distance set based on correlation with the plurality of items and, when a plurality of pieces of content is present, the pieces of content may be aligned in the order of the relative distance from the content corresponding to the shortest distance and executed.

When the content corresponds to music files, the music files may include information on the relative distance set according to correlation with the plurality of items, and the music files may be searched in the order of the relative distance from the music file corresponding to the shortest distance and a predetermined number of music files is executed without being repeated.

An exemplary embodiment of the present invention provides a system for selecting items, including: a touchscreen including a display unit for displaying a plurality of items as icons and an input unit displayed on the display unit and displaying coordinate data corresponding to a touch applied to the display unit; a storage unit storing content; a controller for controlling the display unit of the touchscreen and the storage unit on the basis of a touch signal received through the input unit of the touchscreen; and an output unit for outputting the content under the control of the controller, where the controller is operated by a predetermined program executing a set of instructions embodied in a non-transitory computer-readable medium for executing a method for selecting items, comprising displaying a plurality of items as icons on the touchscreen; receiving a touch signal including information on a touch point on the touchscreen; and determining one or more selected items from among the plurality of items upon reception of the touch signal.

BRIEF DESCRIPTION OF THE DRAWINGS

FIG. 14 illustrates a process of selecting music files according to an exemplary embodiment of the present invention.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
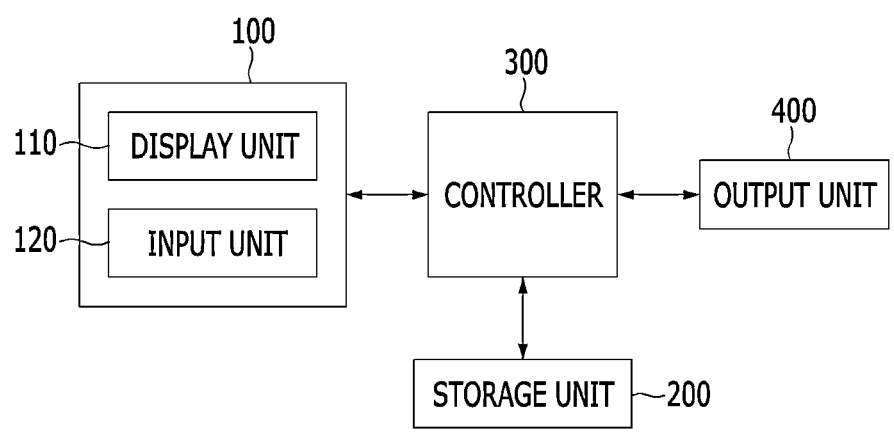
FIG. 1 is a block diagram of a system for selecting items according to an exemplary embodiment of the present invention.

FIG. 1 is a block diagram of a system for selecting items according to an exemplary embodiment of the present invention.

Referring to FIG. 1, the system for selecting items includes a touchscreen 100, a storage unit 200, a controller 300 and an output unit 400.

The touchscreen 100 includes a display unit 110 displaying a plurality of items as icons, and an input unit 120 is displayed on the display unit 110 and generates coordinate data based on a user's touch.

The storage unit 200 stores content. The content includes texts, music files, images, pictures, etc. and is stored in the form of a file.

The controller 300 may be implemented as one or more microprocessors operating by a predetermined program, and the program may include commands for executing steps of a method for selecting items using a touchscreen according to an exemplary embodiment of the present invention, which will be described. Therefore, the program for executing a set of instructions is embodied in a non-transitory computer-readable medium.

The output unit 400 outputs content under the control of the controller 300.

A case in which the content is music will now be described.

Figure 2:
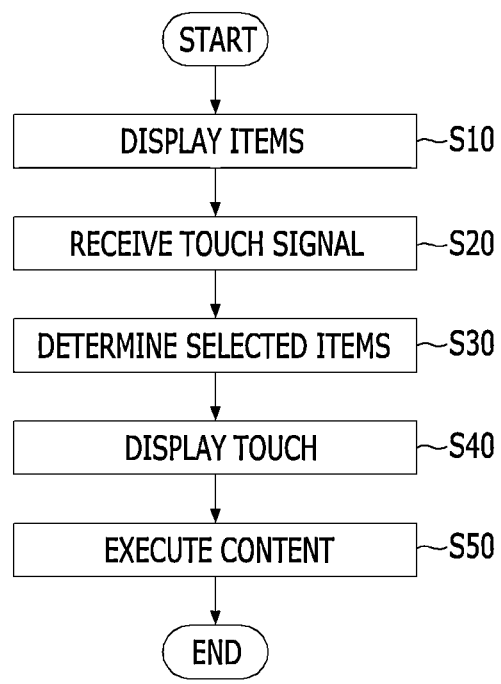
FIG. 2 is a flowchart illustrating a method for selecting items using a touchscreen according to an exemplary embodiment of the present invention.

FIG. 2 is a flowchart illustrating a method for selecting items using a touchscreen according to an exemplary embodiment of the present invention.

Referring to FIG. 2, a plurality of items is displayed as icons on the touchscreen 100 (S10). A touch signal including information on a touch point on the touchscreen 100 is received (S20). Upon reception of the touch signal, one or more selected items from among the plurality of items are determined (S30). Connection of one or more icons indicating the determined selected items and the touch point is displayed (S40), and content corresponding to the determined selected items is reproduced (S50).

Figure 4:
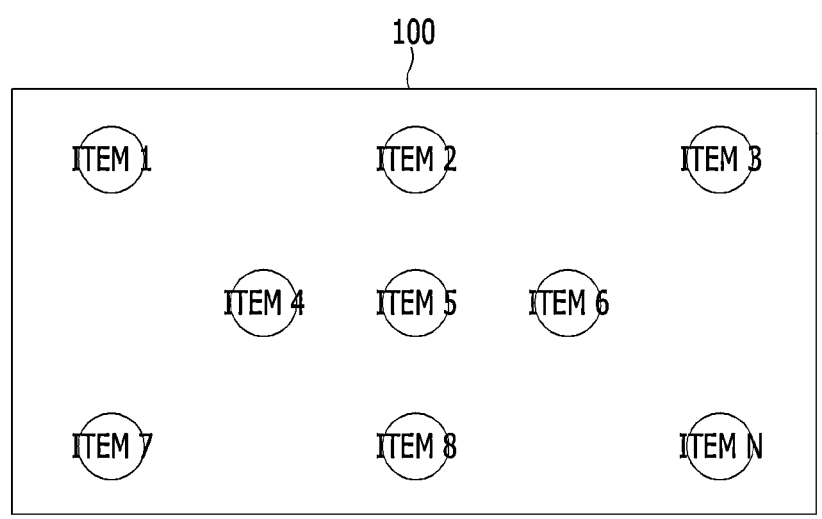
FIGS. 4 and 5 illustrate the display of items on a touchscreen according to an exemplary embodiment of the present invention.
Figure 5:
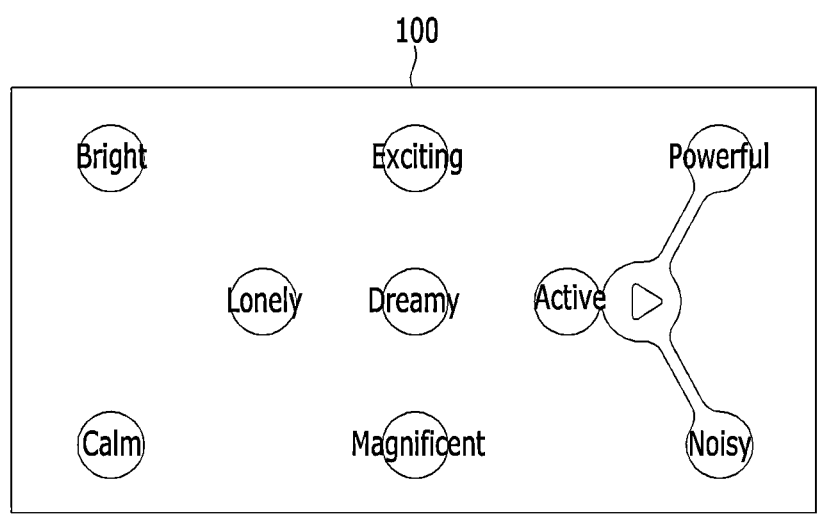
Figure 6:
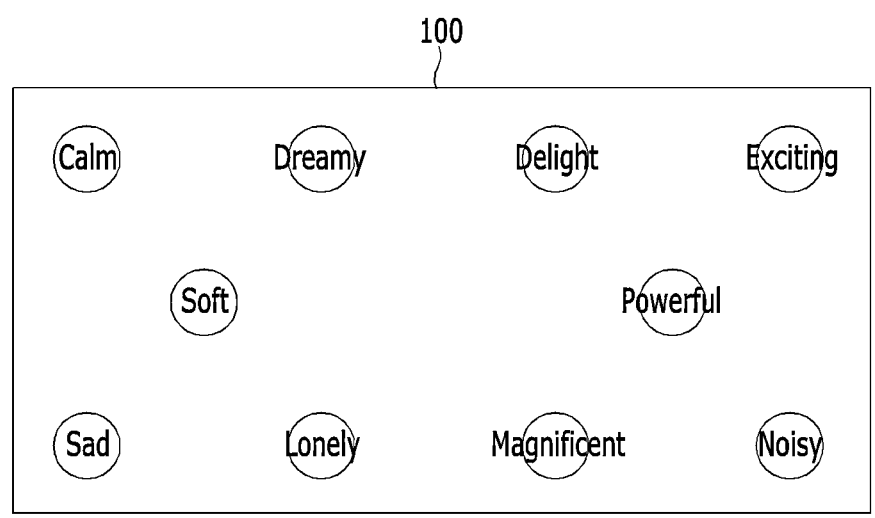
FIG. 6 illustrates the display of items on a touchscreen according to another exemplary embodiment of the present invention.

FIGS. 4 and 5 illustrate the display of items on the touchscreen according to an exemplary embodiment of the present invention and FIG. 6 illustrates display of items on the touchscreen according to another exemplary embodiment of the present invention.

Referring to FIGS. 4-6, the controller 300 controls the display unit 110 to display a plurality of items as icons in the item display step S10. The display unit 110 displays a plurality of items representing attributes of music as icons, such that a user can select desired music. When the user touches one or more icons from among the plurality of icons, items indicated by the touched icons are selected and music files corresponding to the selected items are executed. The plurality of icons may be indicated as a combination of one or more of a circle, a polygon, text, and an image displayed on predetermined regions of the touchscreen 100. The plurality of icons may be represented in the same color or different colors.

When the plurality of items has predetermined correlations, icons corresponding to items having the highest correlation therebetween are displayed closest to each other, and icons corresponding to items having the lowest correlation therebetween are displayed having a longest distance therebetween.

Referring to FIGS. 4 and 5, item 3 and item 7 have low correlation therebetween, and thus icons respectively corresponding to items 3 and 7 are displayed with a long distance therebetween. Item 3 and item 6 have high correlation therebetween, and thus icons respectively corresponding to items 3 and 6 are displayed close to each other.

Figure 3:
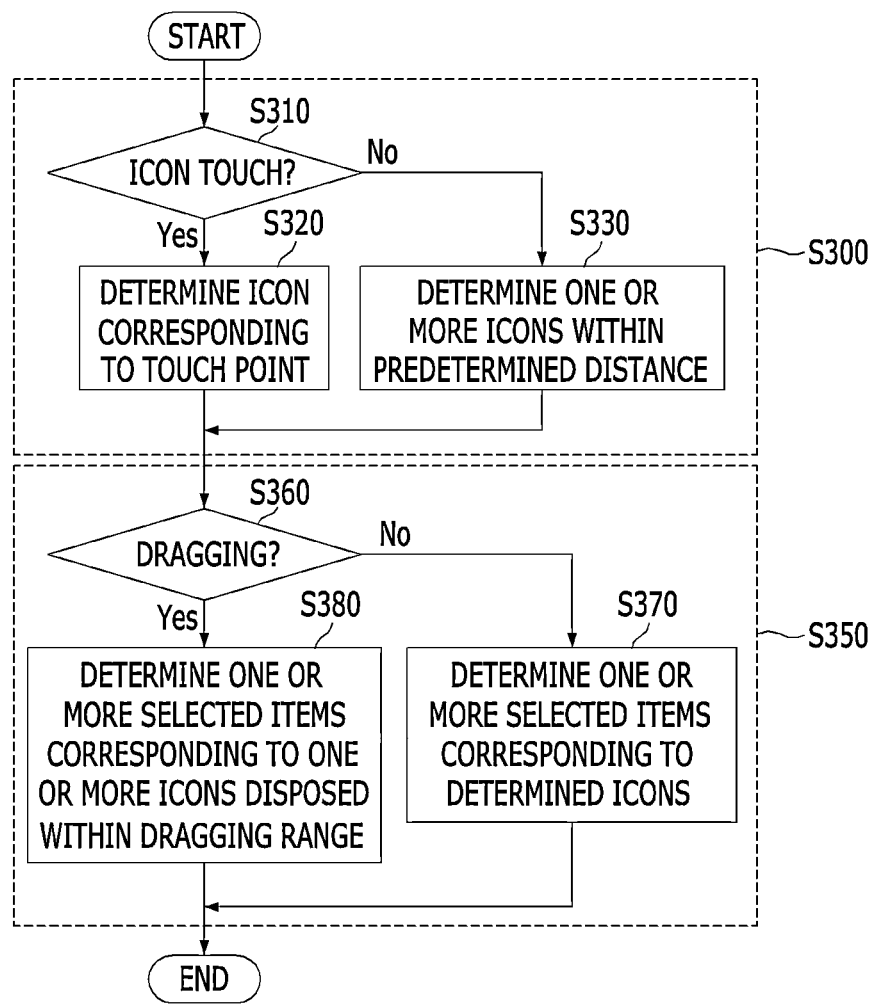
FIG. 3 is a flowchart illustrating a step of determining selected items according to an exemplary embodiment of the present invention.

FIG. 3 is a flowchart illustrating a step of determining selected items according to an exemplary embodiment of the present invention.

Referring to FIG. 3, the controller 300 determines one or more selected items from among the plurality of items upon reception of the touch signal in the selected item determination step S30. The selected item determination step S30 may include a step S300 of determining whether the touch point corresponds to one of the plurality of icons on the basis of the touch point information included in the received touch signal. In addition, the selected item determination step S30 may include a step S350 of determining whether a dragging operation of moving the touch point is performed on the basis of the touch point information included in the received touch signal.

In step S300, the controller 300 determines whether the touch point corresponds to one of the plurality of icons (S310). When the touch point corresponds to one of the plurality of icons, the controller 300 determines the icon corresponding to the touch point (S320). When the touch point does not correspond to the plurality of icons, the controller 300 determines one or more icons disposed within a predetermined distance from the touch point (S330). The predetermined distance may be set such that only icons close to the touch point can be selected from the plurality of icons. An icon having low correlation with an item corresponding to an icon closest to the touch point is excluded from the determined icons.

Figure 13:
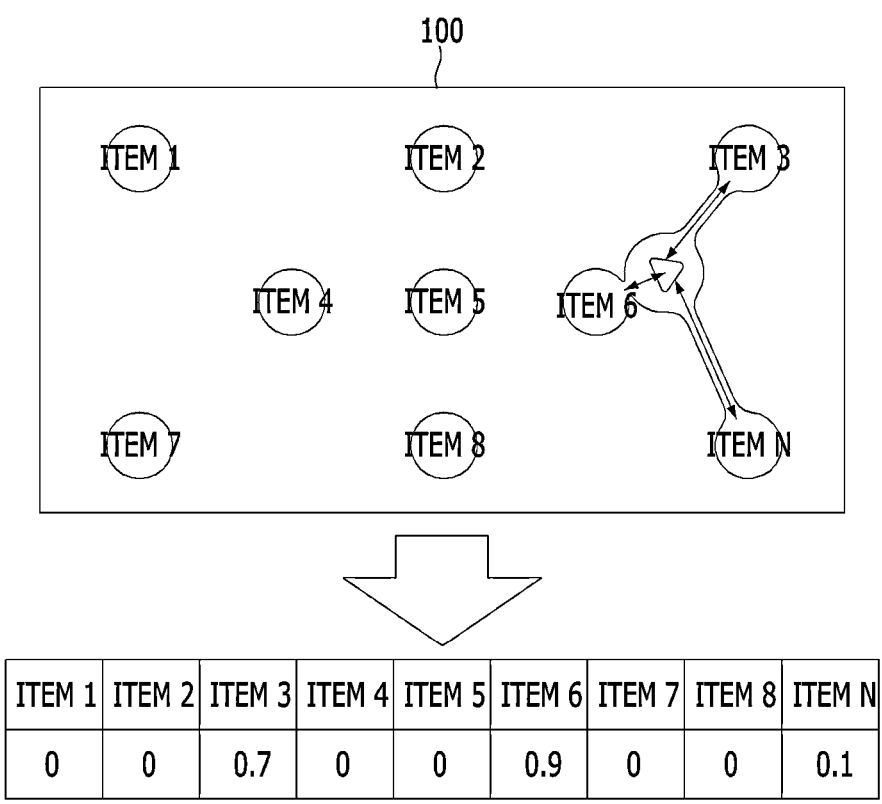
FIG. 13 illustrates a step of determining selected items according to an exemplary embodiment of the present invention.

FIG. 13 illustrates a step of selecting items according to an exemplary embodiment of the present invention.

Referring to FIG. 13, a distance between the touch point and an icon may be normalized to a value in the range of 0 and 1 using a distance vector. For example, when the touch point is disposed at the right side of the icon corresponding to item 6, the distance between the touch point and the icon corresponding to item 6 can be normalized to 0.9. The distance between the touch point and the icon corresponding to item 3 and the distance between the touch point and the icon corresponding to item N can be respectively normalized to 0.7 and 0.1. Accordingly, it can be determined that the icon corresponding to item 6 is closest to the touch point and the icon corresponding to item N is farthest from the touch point, from among three icons within a predetermined distance from the touch point.

In step 350, the controller 300 determines whether a dragging operation of moving the touch point is performed on the basis of the touch point information included in the received touch signal (S360). The controller 300 determines one or more items corresponding to the determined icons as selected items when the dragging operation is not performed (S370). When the dragging operation is performed, the controller 300 determines one or more items corresponding to one or more icons disposed within the dragging range as selected items (S380).

In the touch display step S40, the display unit 110 displays connections between one or more icons indicating the determined selected items and the touch point. For example, connections between the one or more icons indicating the determined selected items and the touch point can be sequentially displayed from icons closest to the touch point such that the user can recognize the selected items.

A process of determining selected items and displaying the determined selected items will now be described with reference to FIGS. 7 to 12. FIGS. 7 to 12 illustrate the selection of items displayed on the touchscreen according to an exemplary embodiment of the present invention.

Figure 7:
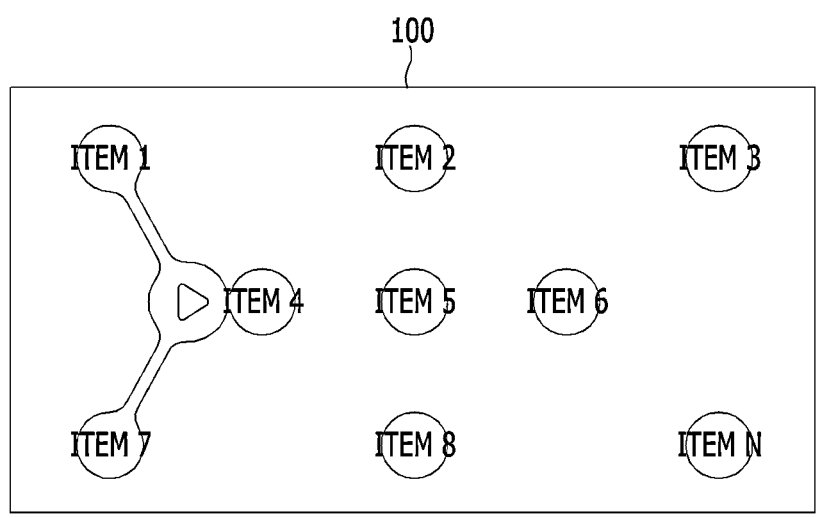
FIGS. 7 to 12 illustrate the selection of items displayed on a touchscreen according to an exemplary embodiment of the present invention.

Referring to FIG. 7, when the touch point is disposed at the left side of an icon corresponding to item 4, the controller 300 determines items 1, 4 and 7 indicated as icons within the predetermined distance as selected items. Here, the display unit 110 displays a connection between three icons respectively indicating the determined selected items and the touch point.

Figure 8:
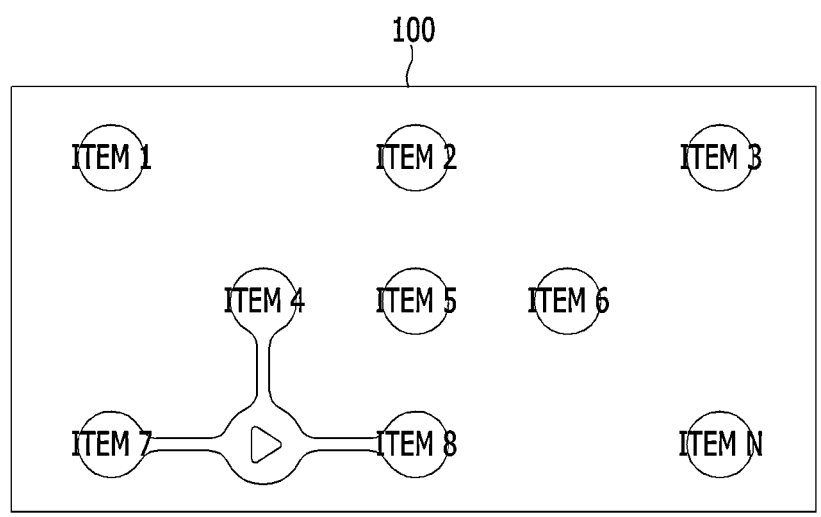

Referring to FIG. 8, when the touch point is disposed between icons respectively corresponding to items 7 and 8, the controller 300 determines items 4, 7 and 8 indicated by icons within the predetermined distance as selected items. The display unit 110 displays a connection between three icons respectively indicating the determined selected items and the touch point.

Figure 9:
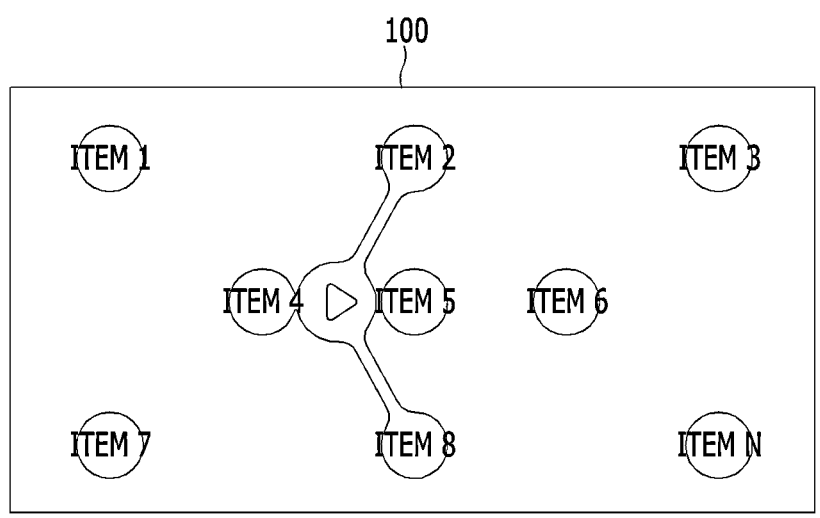

Referring to FIG. 9, when the touch point is disposed between icons corresponding to items 4 and 5 and closer to the icon corresponding to item 4, the controller 300 determines items 2, 4 and 8 indicated by icons disposed within the predetermined distance as selected items. The icon corresponding to item 5 may be determined as a selected item or excluded from selected items according to correlation with item 4 corresponding to the icon closest to the touch point. Here, the display unit 110 displays a connection between three icons respectively corresponding to the determined selected items and the touch point.

Figure 10:
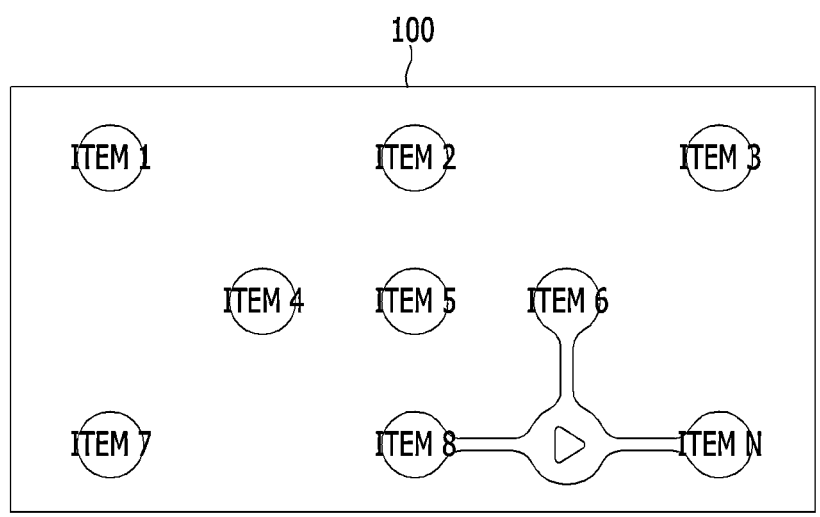

Referring to FIG. 10, when the touch point is disposed between icons respectively indicating item 8 and item N, the controller 300 determines items 6, 8 and N respectively corresponding to icons within the predetermined distance as selected items. Here, the display unit 110 displays a connection between three icons respectively corresponding to the determined selected items and the touch point.

Figure 11:
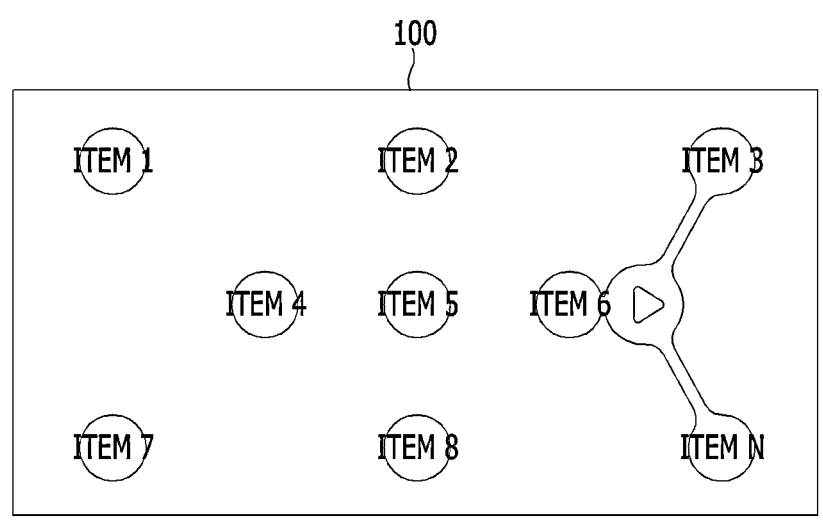

Referring to FIG. 11, when the touch point is disposed at the right side of the icon corresponding to item 6, the controller 300 determines items 3, 6 and N respectively corresponding to icons within the predetermined distance as selected items. Here, the display unit 110 displays a connection between three icons respectively corresponding to the determined selected items and the touch point.

Figure 12:
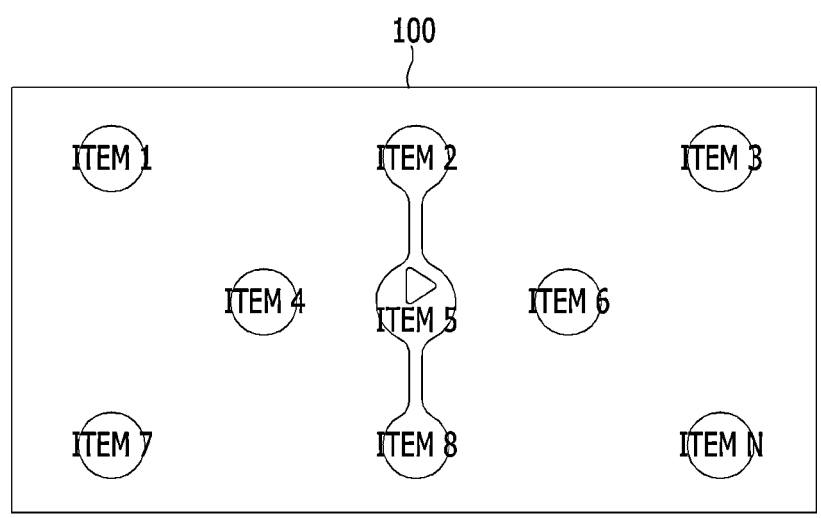

Referring to FIG. 12, when icons corresponding to items 2, 5 and 8 are dragged, the controller 300 determines items 2, 5 and 8 respectively corresponding to icons located in the dragging range of the dragging operation as selected items. Here, the display unit 110 displays a connection between three icons respectively corresponding to the determined selected items and the touch point.

FIG. 14 illustrates a process of selecting music files according to an exemplary embodiment of the present invention.

Referring to FIG. 14, each music file includes information on a distance determined according to correlation between items. For example, items 3, 6 and N can be determined as selected items, the distance between a touch point and an icon corresponding to item 3 and the distance between the touch point and an icon corresponding to item 6 can be normalized to 0.4 and the distance between the touch point and an icon corresponding to item N can be normalized to 0.2. Accordingly, it can be determined that the icons corresponding to items 3 and 6, from among the three icons disposed within a predetermined distance, are closest to the touch point and the icon corresponding to item N is farthest from the touch point.

Therefore, music files at shorter distances from items 3 and 6 rather than item N are sequentially searched and a predetermined number of music files is reproduced without being repeated. The predetermined number may be 100. Accordingly, a user can execute music files closest to items 3 (powerful) and item 6 (active) and close to item N (noisy).

According to the embodiments of the present invention, a user can select items displayed on the touchscreen through one-time touch input or dragging operation.

Furthermore, the present invention promotes safe driving because the user need not touch the user interface to select items multiple times on the user interface, thus reducing the amount of time needed to operate the user interface.

In addition, content including music can be classified into a plurality of items, and content corresponding to items that a user desires can be easily selected.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for selecting items using a touchscreen, comprising the steps of:
    displaying a plurality of items as icons on the touchscreen;
    receiving a touch signal including information on a touch point on the touchscreen;
    determining one or more selected items from among the plurality of items upon reception of the touch signal; and
    executing content corresponding to the determined selected items,
    wherein the content includes information on a relative distance set based on correlation with the plurality of items and, when a plurality of pieces of content is present, the pieces of content are aligned in the order of the relative distance from the content corresponding to the shortest distance and executed.

2. The method of claim 1, wherein the plurality of icons is represented as a combination of at least one of: a circle, a polygon, text, and an image displayed on a predetermined region of the touchscreen.

3. The method of claim 2, wherein the plurality of icons is displayed in the same color or different colors.

4. The method of claim 1, wherein, when the plurality of items has correlation, icons respectively corresponding to items having highest correlation therebetween are displayed closest to each other and icons respectively corresponding to items having lowest correlation therebetween are displayed with a longest distance therebetween.

5. The method of claim 4, wherein the step of determining comprises determining whether the touch point corresponds to one of the plurality of icons on the basis of the information on the touch point included in the received touch signal.

6. The method of claim 5, wherein the icon corresponding to the touch point is determined when the touch point corresponds to one of the plurality of icons and one or more icons disposed within a predetermined distance from the touch point are determined when the touch point does not correspond to any of the plurality of icons.

7. The method of claim 6, wherein an icon indicating an item having low correlation with an item corresponding to an icon closest to the touch point is excluded from the determined icons,
    wherein the distance between the touch point and the icon is normalized to a value in the range of 0 to 1 using a distance vector.

8. The method of claim 6, wherein the step of determining comprises determining whether a dragging operation of moving the touch point is performed on the basis of the information on the touch point included in the received touch signal.

9. The method of claim 8, wherein one or more items corresponding to the determined icons are determined as selected items when the dragging operation of moving the touch point is not performed and one or more items corresponding to one or more icons disposed within the dragging range of the dragging operation are determined as selected items when the dragging operation of moving the touch point is performed.

10. The method of claim 1, further comprising displaying connections between the one or more icons indicating the determined selected items and the touch point.

11. The method of claim 10, wherein connections between the one or more icons corresponding to the determined selected items and the touch point are sequentially displayed from the icon closest to the touch point.

12. The method of claim 1, wherein, when the content corresponds to music files, the music files include information on the relative distance set according to correlation with the plurality of items,
    wherein the music files are searched in the order of the relative distance from the music file corresponding to the shortest distance and a predetermined number of music files is executed without being repeated.

13. A system for selecting items, comprising:
    a touchscreen including a display unit for displaying a plurality of items as icons and an input unit displayed on the display unit and displaying coordinate data corresponding to a touch applied to the display unit;
    a storage unit storing content;
    a controller operated by a predetermined program executing a set of instructions embodied in a non-transitory computer-readable medium to control the display unit of the touchscreen and the storage unit on the basis of a touch signal received through the input unit of the touchscreen; and
    an output unit for outputting the content under the control of the controller,
    wherein the predetermined program includes commands for performing the following steps:
    displaying the plurality of items as icons on the touchscreen;
    receiving the touch signal including information on a touch point on the touchscreen;
    determining one or more selected items from among the plurality of items upon reception of the touch signal; and
    executing content corresponding to the determined selected items,
    wherein the content includes information on a relative distance set based on correlation with the plurality of items and, when a plurality of pieces of content is present, the pieces of content are aligned in the order of the relative distance from the content corresponding to the shortest distance and executed.

* * * * *